US006478982B1

(12) United States Patent
Anamoto et al.

(10) Patent No.: US 6,478,982 B1
(45) Date of Patent: Nov. 12, 2002

(54) FERRITE MAGNET POWDER AND MAGNET USING THE MAGNET POWDER, AND METHOD FOR PREPARING THEM

(75) Inventors: Shuji Anamoto, Osaka (JP); Isamu Furuchi, Saga (JP)

(73) Assignee: Sumitomo Special Metals Co. Ltd. (JP)

( * ) Notice: Subject to any disclaimer, the term of this patent is extended or adjusted under 35 U.S.C. 154(b) by 0 days.

(21) Appl. No.: 09/869,801

(22) PCT Filed: Nov. 8, 2000

(86) PCT No.: PCT/JP00/07864

§ 371 (c)(1),
(2), (4) Date: Jul. 5, 2001

(87) PCT Pub. No.: WO01/35424

PCT Pub. Date: May 17, 2001

(30) Foreign Application Priority Data

Nov. 8, 1999 (JP) ............................................. 11-316306

(51) Int. Cl.$^7$ .............................. C04B 35/26; H01E 1/00
(52) U.S. Cl. .......................... 252/62.63; 252/62.51 R; 252/62.56; 252/62.51; 252/62.62; 423/21.1; 423/138; 423/155; 501/152
(58) Field of Search ....................... 252/62.51 R, 62.56, 252/62.57, 62.62, 62.63; 423/21.1, 138, 155; 501/152

(56) References Cited

U.S. PATENT DOCUMENTS

| 5,846,449 A | | 12/1998 | Taguchi et al. |
| 5,951,937 A | * | 9/1999 | Taguchi et al. .......... 252/62.57 |
| 5,958,284 A | | 9/1999 | Takami et al. |
| 6,086,781 A | | 7/2000 | Taguchi et al. |
| 6,139,766 A | | 10/2000 | Taguchi et al. |

FOREIGN PATENT DOCUMENTS

| JP | 63-138708 | 6/1988 |
| JP | 63-186402 | 8/1988 |
| JP | 9-115715 | 5/1997 |
| JP | 10-149910 | 6/1998 |
| JP | 11-195516 | 7/1999 |
| JP | 11-195517 | 7/1999 |

OTHER PUBLICATIONS

Bulletin of the Academy of Sciences of the USSR, Physical Series, pp. 1405–1408 and 1443–1444, Nov. 11, 1961, vol. 25, No. 11.

Du et al., "Magnetic Properties and High Temperature Composition of the La Ba Fe Zn O Ferrites", pp. 793–794, 1983, Journal of Magnetism and Magnetic Materials 31–34 (No month).

Wei et al., "The Temperature Dependence of Magnetic Properties of Zn–Ti Substituted Ba–Ferrite Particles for Magnetic Recording", pp. 69–72, 1997, Journal of the Magnetics Society of Japan, vol. 21, Supplement No. S2 (No month).

lida et al., "M–Type Ferrite Magnets with High Coercivity", (with partial English translation), 1998, Digests of the 22nd Annual Conference on Magnetics in Japan (No month).

Nishio et al., "Magnetocrystalline Anistropy of M–type ferrite Magnets with High Coercivity", (with partial English translation), 1998, Digests of the 22nd Annual Conference on Magnetics in Japan (No month).

* cited by examiner

Primary Examiner—Elizabeth D. Wood
(74) Attorney, Agent, or Firm—Nixon Peabody LLP; Jeffrey L. Costellia

(57) ABSTRACT

The ferrite magnet powder of the present invention is magnet powder having, as the major phase, a La—Co magnetoplumbite ferrite where La and Co are substituted for Sr and Fe, respectively, represented by $(1-x)SrO \cdot (x/2)La_2O_3 \cdot (n-y/2)Fe_2O_3 \cdot yMO$ wherein x, y, and n represent mole ratios and satisfy $0.22-0.02 \leq x \leq 0.22+0.02$, $0.18-0.02 \leq y \leq 0.18+0.02$, and $5.2 \leq n \leq 6.0$, where $x > y$.

9 Claims, No Drawings

FERRITE MAGNET POWDER AND MAGNET USING THE MAGNET POWDER, AND METHOD FOR PREPARING THEM

TECHNICAL FIELD

The present invention relates to ferrite magnet powder, a magnet using the ferrite magnet powder, and methods for manufacturing the same.

BACKGROUND ART

The ferrite is a generic name for compounds produced from oxides of divalent cationic metals and trivalent iron. Ferrite magnets have found various applications in motors, generators, and the like. As materials for the ferrite magnets, widely used are magnetoplumbite hexagonal-structured Sr ferrites ($SrFe_{12}O_{19}$) and Ba ferrites ($BaFe_{12}O_{19}$). These ferrites are produced at comparatively low cost by a powder metallurgical method using iron oxides and carbonates of strontium (Sr), barium (Ba), and the like.

The basic composition of the magnetoplumbite ferrites is generally represented by a chemical formula "$MO \cdot nFe_2O_3$" where element M is a metal that is to serve as divalent cations, selected from Sr, Ba, Pb, Ni, and the like. Iron ions ($Fe^{3+}$) at respective sites of the ferrite, which have a spin magnetic moment, are coupled by superexchange interaction via intermediate oxygen ions ($O^{2-}$). The magnetic moment of $Fe^{3+}$ ions at their sites are oriented "upward" or "downward" along the c axis. Because the number of sites having an "upward" magnetic moment is different from the number of sites having a "downward" magnetic moment, the ferrite exhibits ferromagnetism (as a ferrimagnet) as the entire crystal.

It is known that, among the magnetic performance of the magnetoplumbite ferrite magnets, the residual magnetic flux density ($B_r$) can be enhanced by improving the Is of crystals and increasing the density of a sintered body and the degree of orientation of the crystals. Also known is that the coercive force ($H_{cj}$) can be enhanced by increasing the rate of existence of single-domain crystals. However, an attempt of by increasing the density of the sintered body to enhance the residual flux density ($B_r$) will facilitate crystal growth, resulting in reducing the coercive force ($H_{cj}$). In reverse, an attempt of enhancing the coercive force by controlling the size of crystal grains by addition of $Al_2O_3$ and the like will reduce the density of the sintered body, resulting in reducing the residual flux density. Various studies were made on the compositions, additives, and production conditions of ferrites for the purpose of enhancing the magnetic properties of the ferrite magnets. However, it was found difficult to develop a ferrite magnet enhanced both in residual flux density and coercive force.

The applicant of the present invention developed a ferrite magnet of which the coercive force was enhanced without reduction in residual flux density by adding Co to a raw material (Japanese Patent Examined Publication Nos. 4-40843 and 5-42128).

After the above development, there was proposed a ferrite magnet of which the saturation magnetization ($\sigma_s$) was enhanced by substituting Zn and La for Fe and Sr, respectively (Japanese Laid-Open Publication Nos. 9-115715 and 10-149910). A ferrite magnet has relatively low saturation magnetization because it is a ferrimagnet in which the magnetic moments of $Fe^{3+}$ ions orient in opposite directions depending on the sites as described above. According to the above publications, however, the "downward" magnetic moments can be reduced by placing ions having a magnetic moment smaller than the magnetic moment of Fe in specific sites of Fe ions, to thereby enhance the saturation magnetization $\sigma_s$. The publications also describe examples using Nd and Pr in place of La, and Mn, Co, and Ni in place of Zn.

The Abstracts of the Magnetics Society of Japan Annual Meeting (distributed on Sep. 20, 1998) discloses ferrite magnets of which both the coercive force (Hcj) and the saturation magnetization ($\sigma_s$) are enhanced by use of La- and Co-added compounds $Sr_{1-x}La_xCo_x\cdot Fe_{12-x}O_{19}$.

The above ferrite magnets are still insufficient in improvement of both the coercive force and the saturation magnetization.

The above-mentioned abstracts (distributed on Sep. 20, 1998) report that the coercive force can be improved to some extent by substituting Co, in place of Zn, for Fe, but fail to describe the cause of this improvement. In addition, the degrees of the improvement of the coercive force and the residual flux density are considered insufficient.

DISCLOSURE OF THE INVENTION

In view of the above, the main object of the present invention is providing ferrite magnet powder enhanced both in saturation magnetization and coercive force, and magnet using such magnet powder. The magnet powder of the present invention is magnet powder having a ferrite major phase represented by $(1-x)AO \cdot (x/2)R_2O_3 \cdot (n-y/2)Fe_2O_3 \cdot yMO$ (where A denotes one or two kinds of metal selected from Sr and Ba, R denotes a rare earth element necessarily including La, and M denotes a divalent metal necessarily including Co), wherein x, y, and n represent mole ratios and satisfy $0.22-0.02 \leq x \leq 0.22+0.02$, $0.18-0.02 \leq y \leq 0.18+0.02$, and $5.2 \leq n \leq 6.0$, where $x > y$.

The bond magnet of the present invention includes the magnet powder described above, and the sintered magnet of the present invention is made of the magnet powder described above.

The method for manufacturing magnet powder of the present invention includes the steps of: preparing raw material mixed powder of $SrCO_3$ powder and $Fe_2O_3$ powder with addition of powder of oxides of La and Co; calcinating the raw material mixed powder to form a ferrite calcinated product as magnet powder having a ferrite major phase represented by $(1-x)AO \cdot (x/2)R_2O_3 \cdot (n-y/2)Fe_2O_3 \cdot yMO$ (where A denotes one or two kinds of metal selected from Sr and Ba, R denotes a rare earth element necessarily including La, and M denotes a divalent metal necessarily including Co), wherein x, y, and n represent mole ratios and satisfy $0.22-0.02 \leq x \leq 0.22+0.02$, $0.18-0.02 \leq y \leq 0.18+0.02$, and $5.2 \leq n \leq 6.0$, where $x > y$; and pulverizing the calcinated product.

The method for manufacturing a magnet of the present invention includes the steps of: preparing raw material mixed powder of $SrCO_3$ powder and $Fe_2O_3$ powder with addition of powder of oxides of La and Co; calcinating the raw material mixed powder to form a ferrite calcinated product as magnet powder having a ferrite major phase represented by $(1-x)AO \cdot (x/2)R_2O_3 \cdot (n-y/2)Fe_2O_3 \cdot yMO$ (where A denotes one or two kinds of metal selected from Sr and Ba, R denotes a rare earth element necessarily including La, and M denotes a divalent metal necessarily including Co), wherein x, y, and n represent mole ratios and satisfy $0.22-0.02 \leq x \leq 0.22+0.02$, $0.18-0.02 \leq y \leq 0.18+0.02$, and $5.2 \leq n \leq 6.0$, where $x > y$; pulverizing the calcinated product to form ferrite magnet powder; and compacting and sintering the ferrite magnet powder.

The method for manufacturing a magnet of the present invention includes the steps of: preparing raw material mixed powder of $SrCO_3$ powder and $Fe_2O_3$ powder with addition of powder of oxides of La and Co; calcinating the raw material mixed powder to form a ferrite calcinated product as magnet powder having a ferrite major phase represented by $(1-x)AO.(x/2)R_2O_3.(n-y/2)Fe_2O_3.yMO$ (where A denotes one or two kinds of metal selected from Sr and Ba, R denotes a rare earth element necessarily including La, and M denotes a divalent metal necessarily including Co), wherein x, y, and n represent mole ratios and satisfy $0.22-0.02 \leq x \leq 0.22+0.02$, $0.18-0.02 \leq y \leq 0.18+0.02$, and $5.2 \leq n \leq 6.0$, where x>y; pulverizing the calcinated product to form ferrite magnet powder; and forming a bond magnet from the ferrite magnet powder.

The value of n is preferably in the range of $5.4 \leq n \leq 5.7$, and x/y is preferably in the range of 1.1 to 1.3.

BRIEF DESCRIPTION OF THE DRAWINGS

FIG. 1(a) is a graph showing the relationship between the mole ratio n representing the composition of a product and the residual flux density $B_r$, and FIG. 1(b) is a graph showing the relationship between the mole ratio n representing the composition of the product and the coercive force $H_{cj}$.

BEST MODE FOR CARRYING OUT THE INVENTION

The magnetic powder of the present invention includes, as a major phase, a ferrite represented by $(1-x)AO.(x/2)R_2O_3.(n-y/2)Fe_2O_3.yMO$ where A denotes one or two kinds of metal selected from Sr and Ba, R denotes a rare earth element necessarily including La, and M is a divalent metal necessarily including Co.

In the above formula, x, y, and n represent mole ratios, and satisfy the relations $0.22-0.02 \leq x \leq 0.22+0.02$, $0.18-0.02 \leq y \leq 0.18+0.02$, and $5.2 \leq n \leq 6.0$, respectively, where x>y. The value n more preferably satisfies the relation $5.4 \leq n \leq 5.7$ as will be described later. Also, x/y is preferably in the range between 1.1 and 1.3, and more preferably x/y=1.2.

In the present invention, in order to substitute $M^{2+}$ for $Fe^{3+}$ of the magnetoplumbite ferrite despite of difference in valence, the element A is used to substitute for part of Fe to compensate the difference in valence. It was conventionally considered that the substitute amounts x and y should preferably be substantially equal to each other. In the present invention, however, x/y is set in the range between 1.1 and 1.3 as described above.

The method for manufacturing magnet powder of the present invention will be described.

Powder of an oxide of the element A and powder of $Fe_2O_3$ (α ferric oxide) are mixed at a mole ratio in the range of 1:5.2 to 1:6.0. During this mixture, an oxide of the element R, an oxide of the element M, and the like are added to the raw material powder. The primary particle sizes of the respective powders are about 0.8 μm for $SrCO_3$, about 0.5 μm for $Fe_2O_3$ powder, about 1.0 9 m for $La_2O_3$, and about 1.0 μm for CoO, for example.

The elements R and M is added to the raw material powder preferably in the form of powder of the respective oxides as described above. Alternatively, it may be added in the form of powder of compounds other than oxides (for example, carbonates, hydroxides, nitrates, and the like).

Other compounds including $SiO_2$, CaO, $CaCO_3$, $SrCO_3$, $Al_2O_3$, $Cr_2O_3$, and the like may also be added as required in the amount of about 1% by weight.

The mixed raw material powder is then heated to a temperature of 1300 to 1400° C. in the atmosphere by use of a rotary kiln or the like to subject the mixture to solid-phase reaction to thereby produce a magnetoplumbite ferrite compound. This process is called "calcination" and the resultant compound is called a "calcinated product". The calcination time is preferably 15 minutes to 3 hours.

The calcinated product obtained in the calcination process includes, as a major phase, a magnetoplumbite ferrite represented by the formula

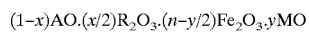

where A denotes one or two kinds of metal selected from Sr and Ba, R denotes a rare earth element necessarily including La, and M denotes a divalent metal necessarily including Co. The average particle size of the calcinated product is in the range of 0.5 to 5 μm.

In the above formula, x, y, and n represent mole ratios, and the raw material powders had been weighed so as to satisfy the relations, $0.22-0.02 \leq x \leq 0.22+0.02$, $0.18-0.02 \leq y \leq 0.18+0.02$, and $5.2 \leq n \leq 6.0$, respectively.

The calcinated product is pulverized or deagglomerated to obtain magnet powder having an average particle size of 0.6 to 1.0 μm. The calcinated product is first roughly pulverized with a roller mill or a rod mill and then finely pulverized with a wet ball mill or a wet attritor. In this pulverization process, which uses a steel ball placed in an aqueous solvent, a trace amount of $Fe_2O_3$ is inevitably mixed in the powder by wear of the steel ball. If Fe is excessively contained, the magnetic properties are deteriorated. Therefore, according to the present invention, in expectation of entering of $Fe_2O_3$, the rare earth element (La and the like) is mixed in an excessive mole amount compared with the equivalent mole amount of the divalent metal M such as Co to be mixed (x>y). The excessive La, as well as Fe, is re-diffused in the crystal and simultaneously diffused in the grain boundary, during sintering. As a result, good magnetic properties are exhibited as will be described later. This effect is exhibited significantly when x/y is in the range of 1.1 to 1.3, and is optimized when it is about 1.2.

The finely pulverized raw material obtained by the pulverization process described above is then compacted. Two compaction methods may be adopted. One is a wet compaction method where the finely pulverized raw material is directly put in a die and compacted in the magnetic field while being dehydrated. The other is a dry compaction method where the raw material is first dried and deagglomerated before being compacted in a die in the magnetic field. The degree of anisotropic orientation of crystal grains in the magnetic field is superior in the wet compaction method due to difference in aggregation of the finely pulverized raw materials. The wet compaction method is therefore suitable in manufacture of high-performance permanent magnets. The resultant compact is sintered in the atmosphere at 1180 to 1240° C. for the duration of about five minutes to about two hours. To attain high density of the sintered product while suppressing crystal growth, a sintering adjuvant such as SiO, and CaO is preferably added to the finely pulverized raw material.

The ferrite magnet powder described above may also be mixed with flexible rubber, rigid and light plastic, or the like and solidified to produce a bond magnet. More specifically, the magnet powder of the present invention is mixed and kneaded with a binder and an additive, and then formed. The formation may be made by injection molding, extrusion, roll forming, or the like.

Thus, according to the present invention, provided is a magnetoplumbite ferrite magnet including a substitute element introduced in an optimum composition in consideration of the iron component inevitably entering in the production process.

EXAMPLE 1

First, raw material powder mixed to have a composition of $(1-x)SrO \cdot (x/2)La_2O_3 \cdot (n-y/2)Fe_2O_3 \cdot yCoO$ where $x=0.22$, $y=0.18$, and $n=5.8$ was calcinated at 1300° C. for about two hours, and then roughly pulverized with a sample mill to a particle size of about 3 μm or less, to obtain powder of a calcinated raw material.

The calcinated raw material was then finely pulverized by a wet method with a ball mill to obtain an average particle size of 0.6 to 0.7 μm. During the pulverization, 0.6 wt % of CaO and 0.45 wt % of $SiO_2$ were added.

The thus-obtained raw material slurry of finely pulverized powder was spontaneously settled and concentrated to have a solid content of 60 wt. %, and then subjected to compaction in the magnetic field using a die having an outer diameter φ36 and a depth of 30 mm.

The resultant compact was sintered at 1220° C. for 30 minutes to produce a sintered magnet.

The resultant sintered magnet had the magnetic properties of the residual flux density Br=0.444 T (4440 G), HCB= 4090 Oe (325 kA/m), the coercive force $H_{cj}$=355 kA/m (4460 Oe), and the maximum energy product $(BH)_{max}$=37.9 $kJ/m^3$ (4.76 MGOe).

The analysis results (wt %) of the raw material components are as shown in Table 1 below.

TABLE 1

|  | $Fe_2O_3$ | SrO | BaO | $La_2O_3$ | CoO | CaO | $SiO_2$ |
|---|---|---|---|---|---|---|---|
| Calcinated raw material (pellet) | 87.28 | 7.61 | 0.22 | 3.47 | 1.33 | 0.02 | 0.03 |
| Sintered product | 86.66 | 7.35 | 0.21 | 3.44 | 1.33 | 0.60 | 0.42 |

While the mole ratio n characterizing the M-type ferrite magnet was smaller (n=5.77) than the stoichiometric value in the analysis results of the calcinated raw material, it increased to a larger value (n=5.90) in the final sintered body. This indicates admixing of $Fe_2O_3$.

The value n was calculated using the equation, $n=(n_1+n_2/2)/(n_3+n_4+2n_5)$ where $n_1$ to $n_5$ are defined as follows.

$n_1$: Analysis value of $Fe_2O_3$/Molecular weight of $Fe_2O_3$ $n_2$: Analysis value of CoO/Molecular weight of CoO $n_3$: Analysis value of SrO/Molecular weight of SrO $n_4$: Analysis value of BaO/Molecular weight of BaO $n_5$: Analysis value of $La_2O_3$/Molecular weight of $La_2O_3$

EXAMPLE 2

A raw material powder mixed to have a composition of $(1-x)SrO \cdot (x/2)La_2O_3 \cdot (n-y/2)Fe_2O_3 \cdot yCoO$ where $x=0.22$, $y=0.18$, and $n=5.4$ was calcinated at 1350° C. for about two hours, and then roughly pulverized with a sample mill to a particle size of about 3 μm or less, to obtain powder of a calcinated raw material.

The calcinated raw material was then finely pulverized by a wet method with a ball mill to obtain an average particle size of 0.6 to 0.7 μm. During the pulverization, 0.6 wt % of CaO and 0.45 wt % of $SiO_2$ were added.

The thus-obtained raw material slurry of finely pulverized powder was spontaneously settled and concentrated to have a solid content of 62 wt. %, and then subjected to compaction in the magnetic field using a die having an outer diameter φ36 and a depth of 30 mm.

The resultant compact was sintered at 1220° C. for 30 minutes to produce a sintered magnet.

The resultant sintered magnet had the magnetic properties of the residual flux density Br=0.445 T (4450 G), HCB= 4110 Oe (327kA/m), the coercive force $H_{cj}$=352 kA/m (4420 Oe), and the maximum energy product $(BH)_{max}$=38.0 $kJ/m^3$ (4.78 MGOe).

The analysis results (wt %) of the raw material components are as shown in Table 2 below.

TABLE 2

|  | $Fe_2O_3$ | SrO | BaO | $La_2O_3$ | CoO | CaO | $SiO_2$ |
|---|---|---|---|---|---|---|---|
| Calcinated raw material (pellet) | 86.68 | 8.23 | 0.22 | 3.47 | 1.33 | 0.01 | 0.03 |
| Sintered product | 86.02 | 7.92 | 0.21 | 3.44 | 1.32 | 0.61 | 0.42 |

While the mole ratio n characterizing the M-type ferrite magnet was smaller (n=5.40) than the stoichiometric value in the analysis results of the calcinated raw material, it increased to a larger value (n=5.53) in the final sintered body. This indicates admixing of $Fe_2O_3$. The value n was calculated using the same equation as that used in Example 1.

Tables 3 and 4 below show the residual flux density $B_r$ and the coercive force $H_{cj}$, respectively, of various magnets having different x and y values in the composition of $(1-x)SrO \cdot (x/2)La_2O_3 \cdot (n-y/2)Fe_2O_3 \cdot yCoO$.

TABLE 3

|  |  | Mixing proportion of CoO (y) | | | | |
|---|---|---|---|---|---|---|
| $B_r$ (T) |  | 0.135 | 0.150 | 0.165 | 0.180 | 0.195 |
| Mixing proportion of $La_2O_3$ (x) | 0.18 | 0.427 | 0.430 | 0.432 | 0.430 | 0.425 |
|  | 0.20 | 0.432 | 0.433 | 0.435 | 0.441 | 0.435 |
|  | 0.22 | 0 | 0.436 | 0.442 | 0.445 | 0.442 |
|  | 0.24 | 0 | 0.438 | 0.440 | 0.442 | 0.443 |
|  | 0.26 | 0 | 0 | 0.426 | 0.432 | 0.439 |

TABLE 4

|  |  | Mixing proportion of CoO (y) | | | | |
|---|---|---|---|---|---|---|
| $H_{cj}$ (kA/m) |  | 0.135 | 0.150 | 0.165 | 0.180 | 0.195 |
| Mixing proportion of $La_2O_3$ (x) | 0.18 | 310 | 314 | 330 | 339 | 326 |
|  | 0.20 | 322 | 327 | 350 | 355 | 345 |
|  | 0.22 | 0 | 334 | 354 | 358 | 350 |
|  | 0.24 | 0 | 334 | 346 | 355 | 357 |
|  | 0.26 | 0 | 0 | 326 | 334 | 341 |

From the experiments performed for preparing Tables 3 and 4, it was found that x>y should preferably beth and that excellent magnetic properties were obtained when x/y was in the range of 1.1 to 1.3. In particular, the most excellent magnetic properties were obtained when x/y=1.2.

FIGS. 1(a) and 1(b) show the relationships between the mole ratio n and the magnetic properties (the residual flux density $B_r$ and the coercive force $H_{cj}$).

In consideration of both the residual flux density $B_r$ and the coercive force $H_{cj}$, it is found that preferable magnetic properties are obtained when $5.2 \leq n \leq 6.0$ and more preferable magnetic properties are obtained when $5.4 \leq n \leq 5.7$.

In the examples described above, Co was substituted for part of Fe of the magnetoplumbite ferrite. Alternatively, Co and Zn may be substituted for part of Fe, to provide substantially the same effect.

INDUSTRIAL APPLICABILITY

According to the present invention, the proportion of an element added for substitution can be optimized, so that both the saturation magnetization and the coercive force can be improved simultaneously. As a result, it is possible to manufacture a calcinated product, magnetic powder, and a magnet that are excellent in saturation magnetization and coercive force.

What is claimed is:

1. Magnet powder of magnetoplumbite ferrite having a ferrite phase represented by $(1-x)AO\cdot(x/2)R_2O_3\cdot(n-y/2)Fe_2O_3\cdot yMO$ (where A denotes on or two kinds of metal selected from Sr and Ba, R denotes a rare earth element necessarily including La, and M denotes a divalent metal necessarily including Co), wherein x, y, and n represent mole ratios and satisfy
$0.20 \leq x \leq 0.24$
$0.16 \leq y \leq 0.20$, and
$5.2 \leq n \leq 6.0$, where x>y.

2. Magnet powder of magnetoplumbite ferrite having a ferrite phase represented by $(1-x)AO\cdot(x/2)R_2O_3\cdot(n-y/2)Fe_2O_3\cdot yMO$ (where A denotes on or two kinds of metal selected from Sr and Ba, R denotes a rare earth element necessarily including La, and M denotes a divalent metal necessarily including Co), wherein x, y, and n represent mole ratios and satisfy
$0.20 \leq x \leq 0.24$
$0.16 \leq y \leq 0.20$, and
$5.4 \leq n \leq 5.7$, where x>y.

3. A bond magnet including the magnet powder according to claim 1 or 2.

4. A sintered magnet made of the magnet powder according to claim 1 or 2.

5. A method for manufacturing magnet powder comprising the steps of:

preparing raw material mixed powder of $SrCO_3$ powder and $Fe_2O_3$ powder with addition of powder of oxides of La and Co;

calcinating the raw material mixed powder to form a ferrite calcinated product as magnet powder having a ferrite phase represented by $(1-x)AO\cdot(x/2)R_2O_3\cdot(n-y/2)Fe_2O_3\cdot yMO$ (where A denotes on or two kinds of metal selected from Sr and Ba, R denotes a rare earth element necessarily including La, and M denotes a divalent metal necessarily including Co), wherein x, y, and n represent mole ratios and satisfy
$0.20 \leq x \leq 0.24$
3 $0.16 \leq y \leq 0.20$, and
$5.2 \leq n \leq 6.0$, where x>y;

pulverizing the calcinated product.

6. The method for fabricating magnet powder according to claim 5, wherein the value of n satisfies $5.4 \leq n \leq 5.7$.

7. A method for manufacturing magnet powder comprising the steps of:

preparing raw material mixed powder of $SrCO_3$ powder and $Fe_2O_3$ powder with addition of powder of oxides of La and Co;

calcinating the raw material mixed powder to form a ferrite calcinated product as magnet powder having a ferrite phase represented by $(1-x)AO\cdot(x/2)R_2O_3\cdot(n-y/2)Fe_2O_3\cdot yMO$ (where A denotes on or two kinds of metal selected from Sr and Ba, R denotes a rare earth element necessarily including La, and M denotes a divalent metal necessarily including Co), wherein x, y, and n represent mole ratios and satisfy
$0.20 \leq x \leq 0.24$
$0.16 \leq y \leq 0.20$, and
$5.2 \leq n \leq 6.0$, where x>y;

pulverizing the calcinated product to form ferrite magnet powder; and compacting and sintering the ferrite magnet powder.

8. A method for manufacturing magnet powder comprising the steps of:

preparing raw material mixed powder of $SrCO_3$ powder and $Fe_2O_3$ powder with addition of powder of oxides of La and Co;

calcinating the raw material mixed powder to form a ferrite calcinated product as magnet powder having a ferrite phase represented by $(1-x)AO\cdot(x/2)R_2O_3\cdot(n-y/2)Fe_2O_3\cdot yMO$ (where A denotes on or two kinds of metal selected from Sr and Ba, R denotes a rare earth element necessarily including La, and M denotes a divalent metal necessarily including Co), wherein x, y, and n represent mole ratios and satisfy
$0.20 \leq x \leq 0.24$
$0.16 \leq y \leq 0.20$, and
$5.2 \leq n \leq 6.0$, where x>y;

pulverizing the calcinated product to form ferrite magnet powder; and forming a bond magnet from the ferrite magnet powder.

9. The method for fabricating a magnet according to claim 7 or 8, wherein the value of n satisfies $5.4 \leq n \leq 5.7$.

* * * * *

UNITED STATES PATENT AND TRADEMARK OFFICE
CERTIFICATE OF CORRECTION

PATENT NO.     : 6,478,982 B1                                    Page 1 of 1
DATED          : November 12, 2002
INVENTOR(S)    : Shuji Anamoto and Isamu Furuchi It is certified that error appears in the above-identified patent and that said Letters Patent is hereby corrected as shown below:

<u>Drawings,</u>
Figure 1(a) and Figure 1(b) were left off of Patent, please include the Figures 1(a) and 1(b) as shown below:

Fig. 1(a)

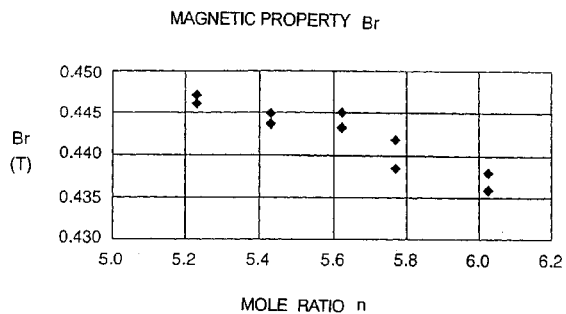

Fig. 1(b)

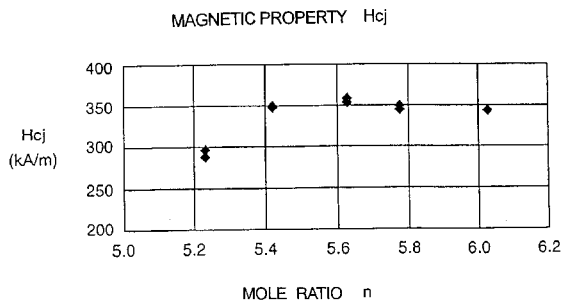

Signed and Sealed this

Eighteenth Day of November, 2003

JAMES E. ROGAN
*Director of the United States Patent and Trademark Office*